United States Patent

[11] 3,594,803

[72] Inventor Gerald L. Pucillo
Braintree, Mass.
[21] Appl. No. 771,530
[22] Filed Oct. 29, 1968
[45] Patented July 20, 1971
[73] Assignee The United States of America as represented by the Administrator of the National Aeronautics and Space Administration

[54] INTEGRATED THERMOELECTRIC GENERATOR/SPACE ANTENNA COMBINATION
4 Claims, 1 Drawing Fig.

[52] U.S. Cl. .......... 343/720, 343/DIG. 3, 343/840, 136/202, 136/206, 136/227
[51] Int. Cl. .......... H01q 1/28, H01v 1/00
[50] Field of Search .......... 343/700, 705, 708, 720, DIG. 3, 840; 136/202, 206, 225, 227, 236

[56] References Cited
UNITED STATES PATENTS
3,057,579 10/1962 Cutler et al. .......... 343/705

*Primary Examiner*—Eli Lieberman
*Attorneys*—John R. Manning, N. T. Musial and J. A. Mackin

ABSTRACT: This disclosure describes an integrated thermoelectric generator/antenna. An antenna is formed of a sandwich of hot and cold thermoelectric elements, such as bismuth and tellurium. Power storage means are connected to the antenna to receive and store the power generated by the thermoelectric action between the elements. In addition, transmitting and receiving means are connected to the antenna so that the antenna transmits and receives signals. Further, a separate source of heat is connected to the "hot" thermoelectric element to provide an auxiliary source of heat for that element when the antenna is not receiving energy from a hot body.

The invention described herein was made by an employee of the United States Government and may be manufactured and used by or for the Government for governmental purposes without the payment of any royalties thereon or therefor.

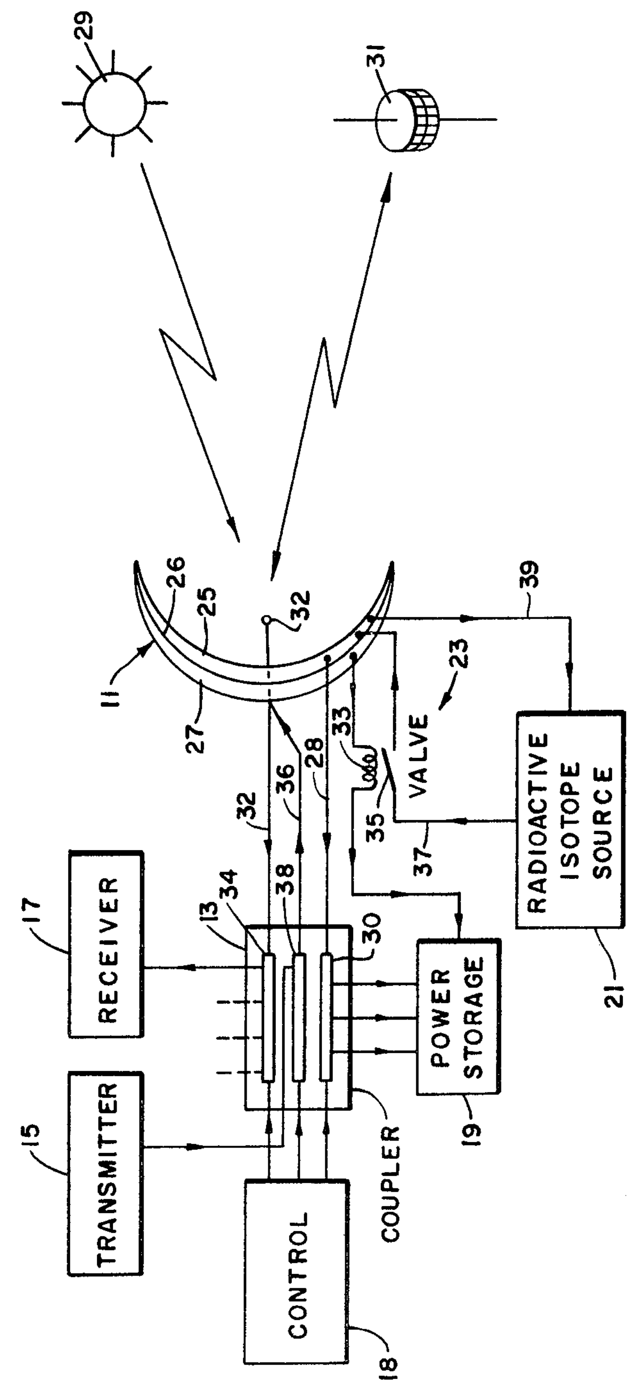
INVENTOR
Gerald L. Pucillo
BY John R. Manning
ATTORNEYS

INTEGRATED THERMOELECTRIC GENERATOR/SPACE ANTENNA COMBINATION

BACKGROUND OF THE INVENTION

One of the major problems of electronic systems used in remote environments is the weight of the system. For example, if electronic devices are to be used onboard a space vehicle, their weight is a vital factor since each added pound of weight requires additional power to place the space vehicle in a desired trajectory. Consequently, it is desirable to reduce the weight of electronic devices to a minimum when the devices are to be used in remote environments.

Two elements that significantly contribute to the weight of electronic devices are antennas and sources of electric power. This contribution is particularly great when the antenna is parabolic antenna and when the source of electric power is a thermoelectric generator. Consequently, it is desirable to reduce the weight of these elements.

Therefore, it is an object of this invention to reduce the weight of electronic devices used in remote environments.

It is also an object of this invention to provide an integrated thermoelectric generator/antenna.

It is another object of this invention to provide an integrated thermoelectric generator/antenna that has a lower mass or weight than prior art separate thermoelectric generators and antennas.

It is yet another object of this invention to provide an apparatus that acts as a thermoelectric generator/antenna and a heat dissipating means.

SUMMARY OF THE INVENTION

In accordance with a principle of this invention, an integrated thermoelectric generator/antenna is provided. The thermoelectric generator/antenna is formed of a sandwich of "hot" and "cold" thermoelectric elements, such as bismuth and tellurium, for example. Power storage means are connected to the thermoelectric generator/antenna to receive and store the power generated by the thermoelectric action between the thermoelectric elements. In addition, transmitter and/or receiver means are connected to the antenna so that the antenna can transmit and/or receive electronic signals.

In accordance with another principle of this invention, a separate source of heat is connect to the "hot" thermoelectric element to provide an auxiliary source of heat for that element when the antenna is not receiving energy from a "hot" body.

In accordance with yet another principle of this invention, the integrated thermoelectric generator/antenna is used onboard a space vehicle and is suitably connected to the space vehicle to provide a heat sink for the space vehicle.

It will be appreciated from the foregoing description that the invention provides an integrated thermoelectric generator/antenna that performs the functions of both a thermoelectric generator and an antenna. Because it performs both functions, separate apparatus for performing the functions do not have to be provided. Hence, the weight of the overall system for providing these functions is reduced. In addition, because the invention provides an auxiliary power source for heating the "hot" thermoelectric component when the antenna is not receiving energy from a hot body such as the sun, power is generated during all periods of time, i.e., whether or not the antenna is pointed toward a hot body. Moreover, by suitably connecting the thermoelectric generator/antenna to a space vehicle, the thermoelectric generator/antenna acts as a heat sink.

It will be appreciated that while the invention is described as suitable for use in a space vehicle, it is also useful in other environments. For example, the thermoelectric generator/antenna of the invention can be used in remote environments on the earth's surface where a lightweight thermoelectric generator and an antenna are useful. Because the weight of the overall system is reduced, the electronic system incorporating the thermoelectric generator/antenna of the invention is more easily transported than prior art systems using separate components to provide thermoelectric power generation and antenna functions.

BRIEF DESCRIPTION OF THE DRAWINGS

The foregoing objects and many of the attendant advantages of this invention will become more readily appreciated as the same becomes better understood by the reference to the following detailed description when taken in conjunction with the FIGURE wherein a preferred embodiment of the invention mounted onboard a space vehicle is illustrated.

DESCRIPTION OF THE PREFERRED EMBODIMENT

The FIGURE illustrates the invention as used onboard a space vehicle and comprises an integrated thermoelectric generator/antenna 11; a coupler 13; a transmitter 15; a receiver 17; a control 18; a power storage 19; a radioactive isotope source 21; and a threshold sensitive relay valve 23.

The thermoelectric generator/antenna may be parabolically shaped and comprises a sandwich of thermoelectric materials which have a hot surface 25 and a cold surface 27. A thermoelectric junction 26 is formed at the interface between the hot surface and the cold surface by any of the conventional means known in the art. The hot surface may be formed of bismuth, for example, and the cold surface may be formed of tellurium. However, it will be appreciated by those skilled in the art and others that the hot and cold surfaces may be formed of other materials that produce a thermoelectric effect. Through conventional thermoelectric action a voltage is generated across the junction 26.

The hot surface 25 is connected by a line 28 to a power bus 30 located in the coupler 13. The power bus 30 has a plurality of outputs that are connected to inputs of the power storage 19.

An antenna element 32 suitably mounted on the inside of the antenna parabola is connected by a line 32 to a receiver bus 34 and by a line 36 to a transmitter bus 38 both located in the coupler 13. The receiver bus 34 is connected to the receiver 17. If desired, a plurality of receivers (as indicated by the dashed lines) may be connected to the receiver bus. The transmitter bus 38 is connected to the transmitter 15; if desired, a plurality of transmitters may be connected to the receiver bus. The control 18 is connected to the power, receiver and transmitter buses to control the flow of signals and power through the buses.

The cold surface is connected through the coil 33 of the threshold sensitive relay valve 23 to the further input of the power storage. The radioactive isotope source 21 is connected via an input pipe 37 through the valve 35 of the threshold sensitive relay valve 23 to the hot surface. A return pipe 39 is also connected between the hot surface 25 and the radioactive isotope source 21. In general, the radioactive isotope source 21 heats a fluent material that flows through the pipes 37 and 39 when the valve 35 is closed for the purposes hereinafter described.

Also illustrated in the FIGURE is a hot body 29 which may be the sun, for example, and a satellite 31. The hot body 29 is illustrated as projecting heat to the hot surface 25. The satellite 31 is illustrated in electronic communication with the thermoelectric generator/antenna 11.

In operation, the hot body 29 heats up the hot surface of the thermoelectric generator/antenna 11 while the other surface is pointed toward space and is cold. Hence, in accordance with the well-known thermoelectric effect, a voltage is generated across the hot and cold surfaces. This voltage is applied through the coupler 13 to the power storage 19 for storage and for use by the space vehicle's electrical system. In addition to coupling the thermoelectric generator to the power storage, the coupler also connects the transmitter 15 to the antenna so that the transmitter can transmit a signal to the satellite 31. Moreover, that satellite 31 can transmit signal that passes through the coupler 13 to the receiver 17. The control 18 controls the flow of power and the flow of transmitted and received signals through the coupler.

When the satellite containing the thermoelectric generator/antenna 11 moves out of the range of the hot body 29, a lower current passes through the relay coil 33 of the threshold sensitive relay valve 23. When this lower current drops below a predetermined threshold level, the valve 35 closes. When the valve closes, the fluent material from the radioactive isotope source 21 applies heat to the hot surface 25 so that electric power continues to be thermoelectrically generated. This electric power is applied to the power storage through the coupler in the manner heretofore described.

Preferably, the amount of power generated when the radioisotope source is connected to the hot surface 25 is less than the threshold value necessary to operate the threshold sensitive relay valve 23. Hence, the threshold sensitive relay valve remains closed. Thereafter, when the antenna again comes within range of the hot body, the current passing through the coil 33 of the threshold sensitive relay increases above the threshold value. When that condition occurs, the relay valve 35 opens and the radioisotope source 21 is disabled. It will be appreciated that the hot surface 25 may include a honeycomb of pipes so that the hot fluent material can flow through the entire surface.

It will be appreciated by those skilled in the art and others that the invention provides an uncomplicated apparatus for combining two functions, i.e., a thermoelectric generator function and an antenna function. Because these functions are integrated into one unit, the overall weight of the means for performing these two functions is reduced. Hence, the invention is suitable for use in electronic systems in remote environments such as onboard a space vehicle.

While the invention has been described for use onboard a space vehicle, it will be appreciated by those skilled in the art and others that the invention is equally suitable for use in remote locations on the earth's surface. In addition, while the invention has been described as mounted on one space vehicle for use in communicating with another space vehicle, it will be appreciated that the other space vehicle could be an earth ground station. Moreover, while the invention has been described as communicating with the sun to obtain heat for its hot surface, it will be appreciated that other hot bodies can be utilized to operate the thermoelectric generator.

It will also be appreciated by those skilled in the art that the coupler 13 could be suitably connected to the space vehicle so as to make the thermoelectric generator/antenna of the invention a heat sink for the space vehicle.

It will be appreciated that the foregoing has described a preferred embodiment of the invention; however, other embodiments will be apparent to those skilled in the art. For example, the antenna could be a dipole antenna formed of thermoelectric generating elements. Moreover, alternative power sources to a radioactive power source can be used to heat the hot surface when the antenna is out of the range of the sun. Further, if no control is desired radioactive isotopes can be impregnated into the hot surface so that power is generated at all times with an increase in power occurring when the thermoelectric generator/antenna is pointed at a hot body. Hence, the invention can be practiced otherwise than as specifically described herein.

What I claim is:

1. An integrated thermoelectric generator/antenna system comprising:

an antenna formed as a sandwich of thermoelectric materials having the hot surface of said sandwich on one side of said antenna;

electronic communication means for transmitting and receiving communication signals;

power storage means for storing electric energy;

coupling means for coupling said electronic communication means and said power storage means to said antenna;

auxiliary heat source means for providing an auxiliary heat source for the hot surface of said thermoelectric sandwich; and selective means for selectively connecting said auxiliary heat to said hot surface.

2. An integrated thermoelectric generator/antenna as claimed in claim 1 wherein the shape of said antenna is parabolic.

3. An integrated thermoelectric generator/antenna system as claimed in claim 1 wherein said auxiliary heat source comprises a radioactive isotope source and said selective means comprises a threshold sensitive relay valve connected so as to sense the power output generated across the thermoelectric junction formed by said thermoelectric materials.

4. An integrated thermoelectric generator/antenna system as claimed in claim 3 wherein said thermoelectric materials are bismuth and tellurium.